H. KOEPKE.
SHOVEL PLOW.
APPLICATION FILED JAN. 29, 1914.
1,095,404.
Patented May 5, 1914.
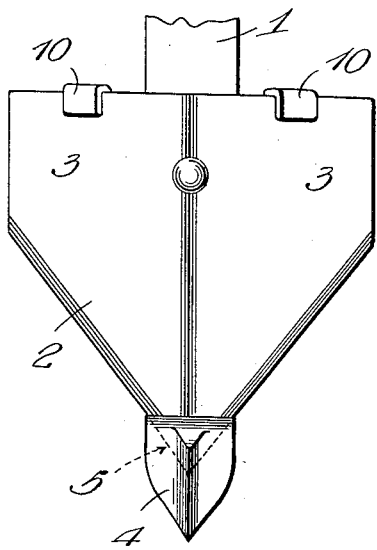
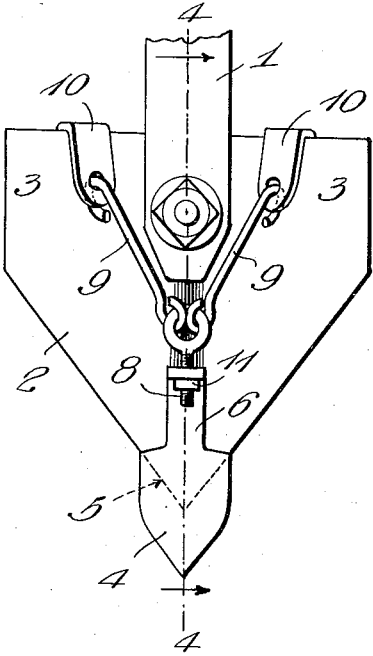
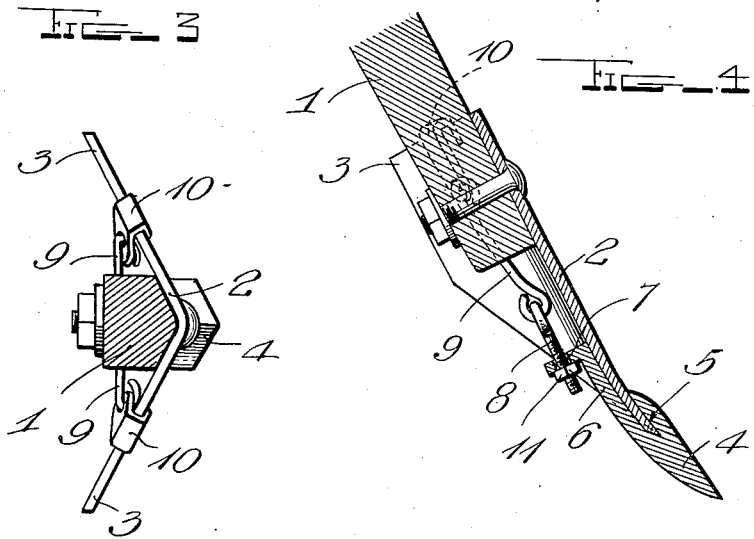
Witnesses
Inventor
Henry Koepke
By
Attorneys

UNITED STATES PATENT OFFICE.

HENRY KOEPKE, OF MARENISCO, MICHIGAN.

SHOVEL-PLOW.

1,095,404.    Specification of Letters Patent.    Patented May 5, 1914.

Application filed January 29, 1914. Serial No. 815,230.

*To all whom it may concern:*

Be it known that I, HENRY KOEPKE, a citizen of the United States, residing at Marenisco, in the county of Gogebic and State of Michigan, have invented certain new and useful Improvements in Shovel-Plows; and I do declare the following to be a full, clear, and exact description of the invention, such as will enable others skilled in the art to which it appertains to make and use the same.

My invention relates to shovel plows but more especially to removable points for the same.

One object of my invention is to strengthen the point shovel plow for hard or stony soil by addition of a supplemental steel point.

Another object is to provide a supplemental point which can be readily removed and replaced when necessary.

A still further object is to provide a novel attaching means by which the point is secured to the shovel plow.

With these and other objects in view, my invention consists of certain novel details of construction and combination and arrangement of parts, all of which will be more particularly described and claimed.

In the accompanying drawings in which corresponding numerals indicate similar parts, Figure 1 is a front elevation of my improved shovel plow; Fig. 2 is a rear elevation thereof, illustrating my improved means for removably and adjustably securing the point to the shovel plow; Fig. 3 is a plan view, the plow standard being in section, and Fig. 4 is a longitudinal sectional view taken on the line 4—4 of Fig. 2.

Referring more particularly to the drawings, the numeral 1 indicates a plow standard to which is secured an ordinary shovel plow 2, the wings 3 of which project on opposite sides of said standard.

In carrying into effect the objects of my invention as hereinbefore stated, I provide a supplemental steel point 4, having in its base a socket 5, into which is inserted the point of shovel plow 2. The under side of the point 4 is formed with the tongue 6, which when the supplemental point is engaged with the point of the shovel plow, acts as a reinforcement for the latter. The free end of tongue 6 is bent outwardly at right angles to the point and provided with a bolt opening 7. For the maintenance of the supplemental point in position as well as to provide a means for adjusting the tension of the same, I provide an eye bolt 8, the threaded shank of which extends through the opening 7. Connected with the eyebolt 8 and diverging therefrom are the two rods 9, whose free ends are connected with the hook shaped clamps 10, which latter are disposed on opposite sides of the standard 1, and embrace the upper edges of wings 3.

In view of the foregoing arrangement it will be obvious that when a nut 11 is placed on the portion of the shank of eyebolt 8 which projects through the opening 7, the supplemental point is not only held in position, but by screwing and unscrewing the nut 11, I am enabled to place any desired tension upon said point.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

Having thus described my invention, what I claim is:—

1. A device of the character described comprising a shovel, a supplemental point having therein a socket to receive the shovel point, clips engaging the upper edge of said shovel, and means connecting said clips with said supplemental point whereby the latter is retained in its proper position.

2. A device of the character described comprising a shovel plow, a supplemental point having therein a socket adapted to receive the shovel point, clips engaging the upper edge of said shovel, an eye bolt adjustably engaged with said supplemental point, and rods connecting said clips and eyebolt whereby the supplemental point is adjustably connected with said shovel.

3. The combination of a plow standard, a shovel secured thereto, the wings of the latter projecting on opposite sides of said standard, a supplemental point having therein a socket to receive the shovel point and provided on its under side with a right angular projection having therein an opening, clips disposed on opposite sides of the standard and engaged with the upper edges of said wings, an eyebolt having its shank extended through the opening in said right angular projection, a nut engaged with said shank, and rods connecting said clips and eyebolt whereby the supplemental point is adjustably connected with said shovel plow.

In testimony whereof I have hereunto set my hand in presence of two subscribing witnesses.

HENRY KOEPKE.

Witnesses:
BLANCHE E. CLANCY,
R. N. VAN DOREN.

Copies of this patent may be obtained for five cents each, by addressing the "Commissioner of Patents, Washington, D. C."